June 9, 1953 S. A. BLACK 2,641,128
APPARATUS FOR TESTING ELASTIC MATERIAL
Filed Sept. 17, 1948 2 Sheets-Sheet 1
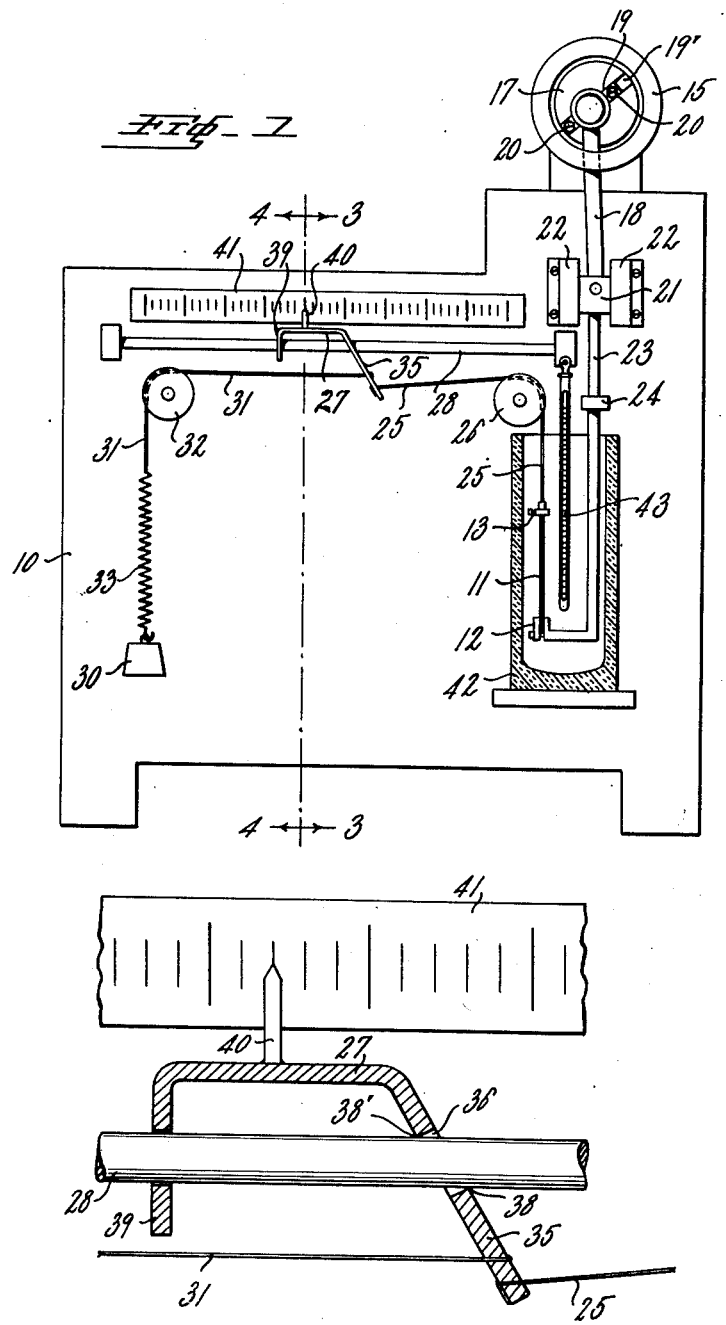
INVENTOR.
SHEPPARD A. BLACK
BY
Charles C. Willson
ATTORNEY June 9, 1953　　　　　S. A. BLACK　　　　　2,641,128
APPARATUS FOR TESTING ELASTIC MATERIAL
Filed Sept. 17, 1948　　　　　　　　　　　　2 Sheets-Sheet 2
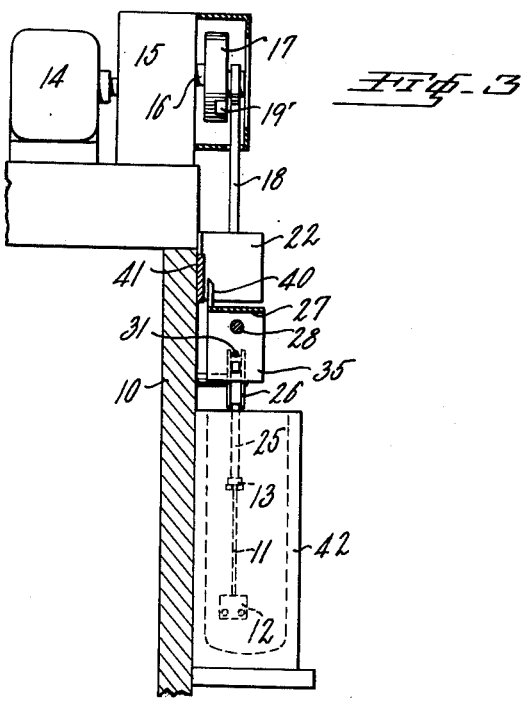
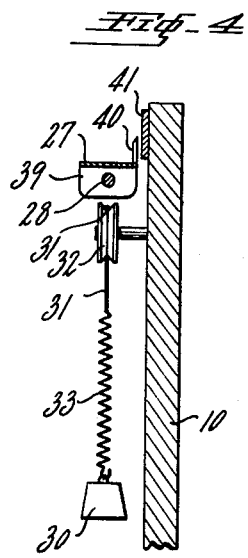
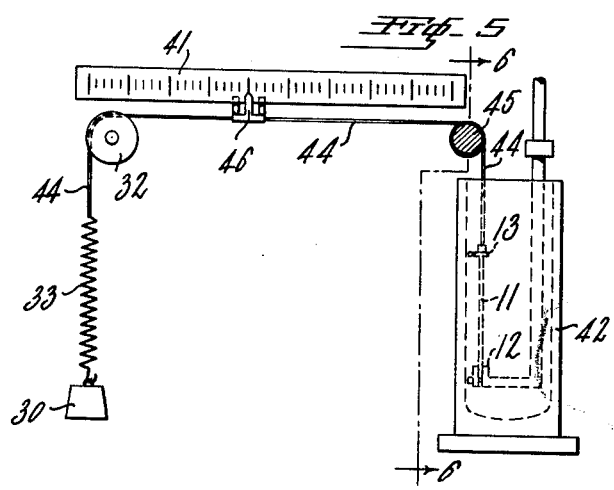
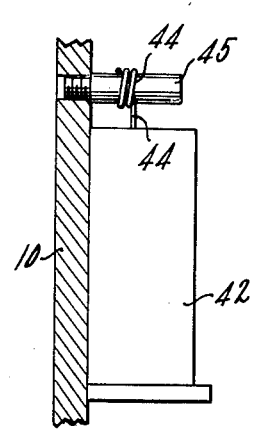
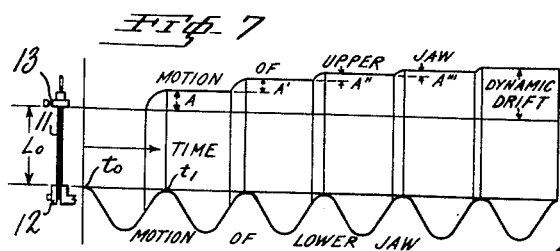
INVENTOR.
SHEPPARD A. BLACK
BY
Charles C. Willson
ATTORNEY Patented June 9, 1953

2,641,128

UNITED STATES PATENT OFFICE 2,641,128

APPARATUS FOR TESTING ELASTIC MATERIAL

Sheppard A. Black, Nutley, N. J., assignor to United States Rubber Company, New York, N. Y., a corporation of New Jersey Application September 17, 1948, Serial No. 49,730

1 Claim. (Cl. 73—91)

This invention relates to an apparatus for testing the behavior of strips or lengths of elastomers under dynamic strain, and more particularly to an apparatus for determining the tendency of such elastomers to acquire a cumulative sub-permanent set under a cyclically imposed strain.

A very common and troublesome type of failure in low temperature service of butyl rubber inner tubes in non-butyl rubber automobile tires is that known as "buckling." At low temperatures, e. g., 10° F. and below, depending on the inflation pressure, butyl rubber becomes so sluggish that a butyl inner tube fails to retract as fast as the non-butyl tire after they have both been bent or strained in passing through the region of contact with the ground. The resulting slack is accumulated as the inner tube continues to be strained and unstrained with each revolution of the tire. Eventually a buckle or fold is formed in the tube and the tube finally fails, typically by chafing at the buckle.

In order to predict the tendency or inner tubes to fail at low temperatures by buckling, and thus make possible the development of superior inner tube compositions without resorting to expensive and time-consuming road tests at low temperature, it has been proposed to carry out various tests on elastomeric samples. Such tests include the T-50 test, brittle point determination, low temperature rebound test, low temperature hysteresis test, and determination of speed of retraction after straining at low temperatures. However, it has been found that none of these tests can be correlated with the behavior of the elastomer material as represented by actual performance in service, and for this reason research and development work on improved butyl rubber compounds has been seriously impeded.

A principal object of the present invention is to provide an apparatus for predicting the tendency of butyl rubber inner tubes to fail by buckling in the tire at low temperature.

Accordingly, the invention provides an apparatus for predicting the performance of elastomer materials under certain service conditions. The method comprises subjecting a sample of the material to a rapid cyclic strain while continually taking up all of the resulting inchoate slack as it tends to occur in each cycle and accumulating the said slack over successive cycles, whereby the magnitude of the said accumulated slack may be observed. The accumulated slack produced in this manner may be referred to as cumulative sub-permanent set. It has been found that the magnitude of the cumulative sub-permanent set of a sample tested in this manner shows excellent correlation with the behavior of butyl rubber inner tubes in low temperature service on the road, so that the need for expensive and inconvenient road testing of each experimental compound is obviated.

The present testing device comprises means for applying a rapid cyclic tensile strain to the sample, means for continually urging one end of the sample in such direction as to take up all of the resulting inchoate slack over the entire portion of each cycle during which slack tends to occur, and means for preventing said end of the sample from moving in a direction opposite to the aforesaid direction. A suitable indicating or recording device may be associated with the means for taking up slack, whereby the magnitude of the accumulated slack, or cumulative sub-permanent set, may be determined as the test proceeds.

The cumulative sub-permanent set determined by this test is hereinafter referred to as the "dynamic drift" of the sample.

The structure of a testing apparatus of this invention and the method of practicing the invention will be more fully understood from the following detailed description, when read in conjunction with the accompanying drawing; wherein Fig. 1 is an elevation of a testing apparatus constructed in accordance with the present invention;

Fig. 2 is a detail in section of parts shown in Fig. 1 for accumulating slack and for indicating the magnitude of the accumulated slack;

Fig. 3 is a sectional view of the apparatus taken along the line 3—3 of Fig. 1 looking in the direction of these arrows;

Fig. 4 is a similar sectional view taken on the same line but looking in the direction of the arrows 4—4;

Fig. 5 is a modification showing a different form of slack accumulating means;

Fig. 6 is a sectional view taken along the line 6—6 of Fig. 5; and

Fig. 7 is a graphical representation of the motion of the upper and lower jaws indicated on the vertical axis and plotted against time on the horizontal axis.

In Figs. 1, 3 and 4 the testing apparatus is shown supported on a suitable frame 10. A sample 11 of the elastomer material to be tested is clamped over each end by suitable means to a lower jaw 12 and an upper jaw 13. The desired cyclic tensile strain is imparted to the sample by oscillating the lower jaw. This may be done by any suitable means such as by a variable speed drive herein shown as a motor 14 and variable speed box 15 adapted to rotate a shaft 16 having a crank head 17. A crank rod 18 is adjustably connected to the crank head 17 through a block 19, which may be adjusted in a slot 19' in the crank head by loosening retaining screws 20. The lower end of the crank rod 18 is pivotally attached to a sliding head 21 which moves up and down in guide block 22 thus imparting up-and-down motion to a rod 23 which rides in a guide block 24. The lower jaw 12 is attached to and reciprocated by this rod 23. While the sample 11 is thus being strained, the upper jaw 13 is restrained from moving downwardly by a metal tape 25 which passes over a pulley 26 and is connected to a one-way "no-back" slider 27. The slider, as will be apparent from Fig. 2, is so positioned on rod 28 that it cannot move in such a direction as to permit the upper jaw 13 to move downwardly. Thus the upper jaw is fixed so far as the downward motion is concerned. However, the slider is free to move in the opposite direction under the influence of a suspended weight 30 whenever the sample tends to become slack. The weight 30 is attached to the slider 27 by means of a wire 31 which passes over a pulley 32. A spring 33 is used between the weight 30 and the wire 31 in order to permit very rapid motion of the upper jaw 13 and the slider 27 without requiring rapid acceleration of the weight. The weight 30 places a small stress on the sample 11 at all times so that the sample is under slight tension even when the lower jaw 12 is in the uppermost, or "zero strain," position.

The construction and operation of the slider will be clear from a consideration of Fig. 2 which shows how the slider 27 is positioned on the rod 28. A slanting leg 35 of the slider has a hole 36 drilled at right angles to the surface of the leg. The rod 28 passing through this hole is of slightly smaller diameter than the hole. It will be evident that when tension is applied to the slanting leg by the metal tape 25, as it will be each time the sample 11 is strained by downward motion of the jaw 12, the edges 38 and 38' of the hole 36 will press firmly with a clamping action against the rod 28, thus, by frictional resistance, preventing the slider 27 from moving to the right in Fig. 2. On the other hand if tension is applied to the slider in the opposite direction by the wire 31, the edges 38 and 38' are unclamped from the rod and the slider is free to yield to the tension whenever the sample 11 tends to become slack. The vertical leg 39 of the slider rides on the rod loosely enough to prevent it from interfering with the clamping and unclamping action described. Its purpose is to maintain the slider in the proper attitude so that the clamping action can occur instantly. In this way the sliding "no-back" acts similarly to a ratchet and pawl, permitting one-way motion only.

The pointer 40 and the scale 41 permit the movement of the slider and hence of the upper sample holder 13 to be measured during the test. This movement represents the dynamic drift of the sample, caused by the cyclic tensile strain to which the sample has been subjected during the test.

In order to carry out the test at the low temperatures at which butyl rubber inner tubes exhibit buckling, viz., at $+10$ to $-40°$ F. depending upon the inflation pressure, an insulating bottle 42 containing a suitable cold bath is provided. The temperature is observed with a thermometer 43.

The test is carried out by attaching a small sample of the elastomer sheet material e. g., one about two inches long, to the holder jaws 12 and 13. The attachment of crank rod 18 to the crank head 17 may be adjusted by loosening the screws 20 and moving the block 19 in the slot 19' to give the desired length of stroke to the movable jaw 12, usually on the order of 10% of the unstrained length of the sample, although other lengths of stroke may be used. In this machine the strain applied to the sample is sinusoidal in form, but strains of other character may be applied in the test if desired. The variable speed drive 15 is adjusted to give the desired frequency of straining, usually 600 cycles per minute (which is comparable with a tire speed of about 40–50 miles per hour), although the test may be conducted at other speeds if desired, e. g., 200 to 1000 cycles per minute. It is usually preferred to select a length and frequency of stroke which approximately duplicate the dynamic strain to which the elastomer will be subjected in service. The dynamic drift measured in the test will generally be found to be approximately a linear function of the frequency at which the sample is strained.

At the start of the test, the cold bath in the insulating bottle 42 is adjusted to give the desired temperature. The weight 30 is placed gently on the spring 33 and the position of the pointer 40 is noted. The weight places a small stress on the sample at all times. The sample is then oscillated at the desired speed and amplitude for a measured length of time. As the sample tends to become slack due to sub-permanent set, the weight pulls the slider 27 and the upper jaw 13 so that no actual buckling of the sample occurs.

The action of the machine during the test will be better understood by a consideration of the graph of Fig. 7. The original unstrained length of the sample 11 is illustrated by the distance designated by $L_0$ in the graph. As the lower jaw moves down and up as from point $t_0$ to point $t_1$ on the graph, the resulting increase in length of the sample, represented by the distance A, is taken up by the upward motion of the upper jaw 13. With a typical butyl rubber sample successive straining cycles produce successively less drift, or increase in length, as represented in a purely diagrammatic way by distances A', A'', A'''. The magnitude of the accumulated slack, or dynamic drift, as shown in Fig. 7, is represented by the total movement of the upper sample jaw 13 during the test, which may be read on the scale 41. Generally, with butyl rubber compounds, the dynamic drift will reach a limiting maximum value after 5 to 10 minutes of operation at 600 cycles with a 10% stroke. The dynamic drift so measured is conveniently expressed as the percent of dynamic drift, i. e., the relative increase in length of the sample during the test based on the original length of the sample. As an example of the results obtained in the test, a sample of butyl rubber compound which failed in service by buckling had a dynamic drift of about 135%, while another butyl rubber sample which did not buckle in service had a dynamic drift of about 90% (measured at $-20°$ F. at a 10% stroke and a frequency of 600 cycles per minute, after operating the machine for two minutes).

It will be evident that the device of this invention may be modified in various particulars. Thus, other means may be used for taking up and accumulating the slack. Figs. 5 and 6 show a type of friction snubber which may replace the one-way sliding "no-back" of Figs. 1 and 2. This comprises an inextensible cord 44, such as a glass cord, which is attached to the upper sample holder 13 at one end and to the spring 33 supporting the slack take-up weight 30 at the other end. The cord is wound two or three times around a polished non-rotating rod 45. The lower sample jaw 12 is oscillated by the rod 23 in exactly the same manner as previously described. It will be evident that as the cord tends to become slack due to development of sub-permanent set in the sample 11, the weight 30 will continually move the cord 44 and the upper sample holder 13 to take up the incipient slack. By the action of taking up the slack, the cord becomes tightly wound around the polished rod 45 preventing downward movement of the upper sample jaw 13. The magnitude of the dynamic drift is indicated by a pointer 46 attached to the cord 44. The remainder of the modified machine is the same as shown in Fig. 1. Other devices may be used for obtaining the desired one-way action, e. g., an extremely fine toothed ratchet.

It should be noted that in the testing apparatus of this invention all of the incipient slack in the sample is continually taken up as it occurs, and this positive take-up action is carried out over the entire period of each cycle during which slack tends to occur. That end of the sample which moves to take up slack is restrained from moving in the opposite direction during the entire strain cycle. These features of the invention have been discovered to be essential to good correlation between the results obtained by the tests and by actual performance of butyl rubber inner tubes in service. When carried out in this manner the test is an invaluable aid in the development of improved compounds because it permits very rapid evaluation of stocks as compared to the slow method of road testing.

Having thus described my invention, what I claim and desire to protect by Letters Patent is:

An apparatus for testing an elastomeric sample comprising a frame, means for engaging one end of the sample and means for engaging the opposite end of the sample, a connecting element slidably mounted on said frame and extending from the said means engaging one end of the sample, a one-way braking attachment interconnected between said frame and said connecting element to prevent said connecting element from moving toward the said one end of the sample at any time, without restraining movement of said connecting element away from said one end of the sample at any time, mechanism mounted on said frame and operably connected to the means engaging said opposite end of the sample for reciprocating said opposite end toward and away from said first mentioned end so as to apply a cyclic tensile strain to the said sample, a spring connected to said connecting element, a tensioning device connected to said spring to continually urge the said connecting element away from said first mentioned one end of the sample, whereby incipient slack, produced in the sample as said reciprocated end is moved toward said first mentioned end, is continually taken up instantly as it occurs in the strain cycle by movement of said connecting element away from the sample under the influence of said tensioning device, and the sample is never actually permitted to become slack at any time during the strain cycle, and means attached to said connecting element for indicating the extent of movement of said connecting element with respect to the said frame to reveal the magnitude of slack accumulated as the test proceeds.

SHEPPARD A. BLACK.

References Cited in the file of this patent

UNITED STATES PATENTS

| Number | Name | Date |
|---|---|---|
| 1,923,296 | Castricum | Aug. 22, 1933 |
| 2,066,311 | Appel et al. | Jan. 5, 1937 |
| 2,157,092 | Allen et al. | May 9, 1937 |
| 2,240,505 | Lessig | May 6, 1941 |
| 2,291,086 | Lessig | July 28, 1942 |
| 2,328,967 | Donnel et al. | Sept. 7, 1943 |
| 2,411,779 | Dillon et al. | Nov. 26, 1946 |

FOREIGN PATENTS

| Number | Country | Date |
|---|---|---|
| 876,386 | France | Aug. 3, 1942 |